Figure 1:
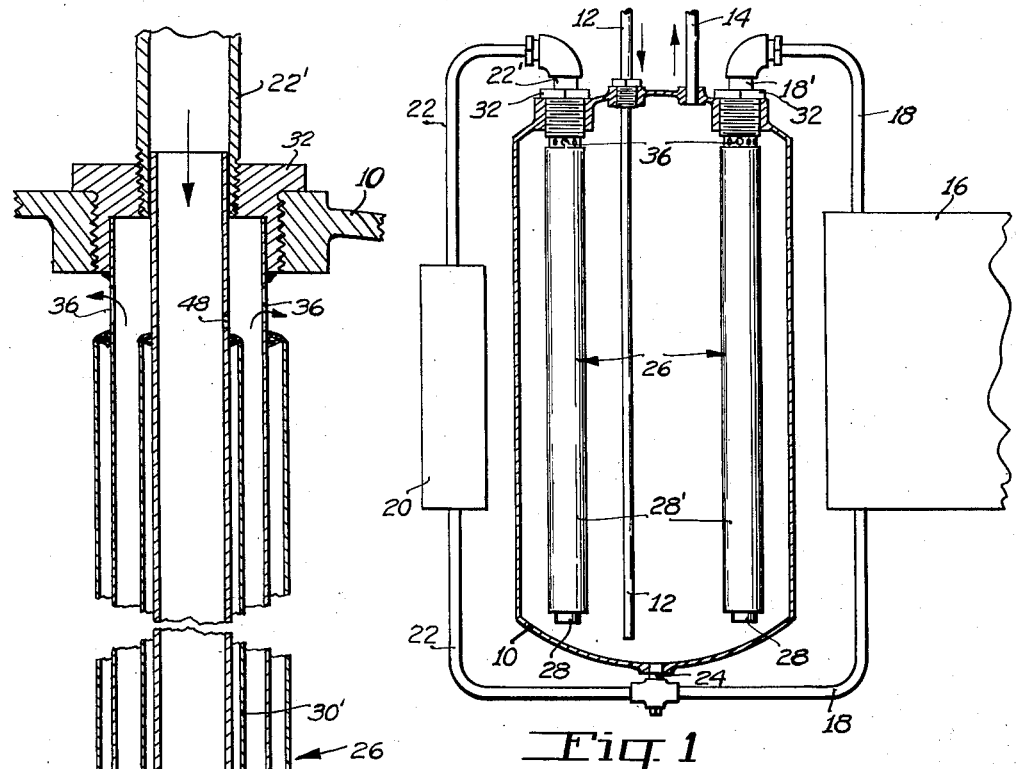

April 29, 1952 B. H. BLONDEAU 2,594,616
HOT-WATER HEATING DEVICE AND METHOD
Filed Oct. 4, 1948 3 Sheets-Sheet 1

INVENTOR.
BENJAMIN H. BLONDEAU
BY
Reynolds + Beach
ATTORNEYS

April 29, 1952     B. H. BLONDEAU     2,594,616
HOT-WATER HEATING DEVICE AND METHOD
Filed Oct. 4, 1948     3 Sheets-Sheet 2

INVENTOR.
BENJAMIN H. BLONDEAU
BY
Reynolds Beach
ATTORNEYS

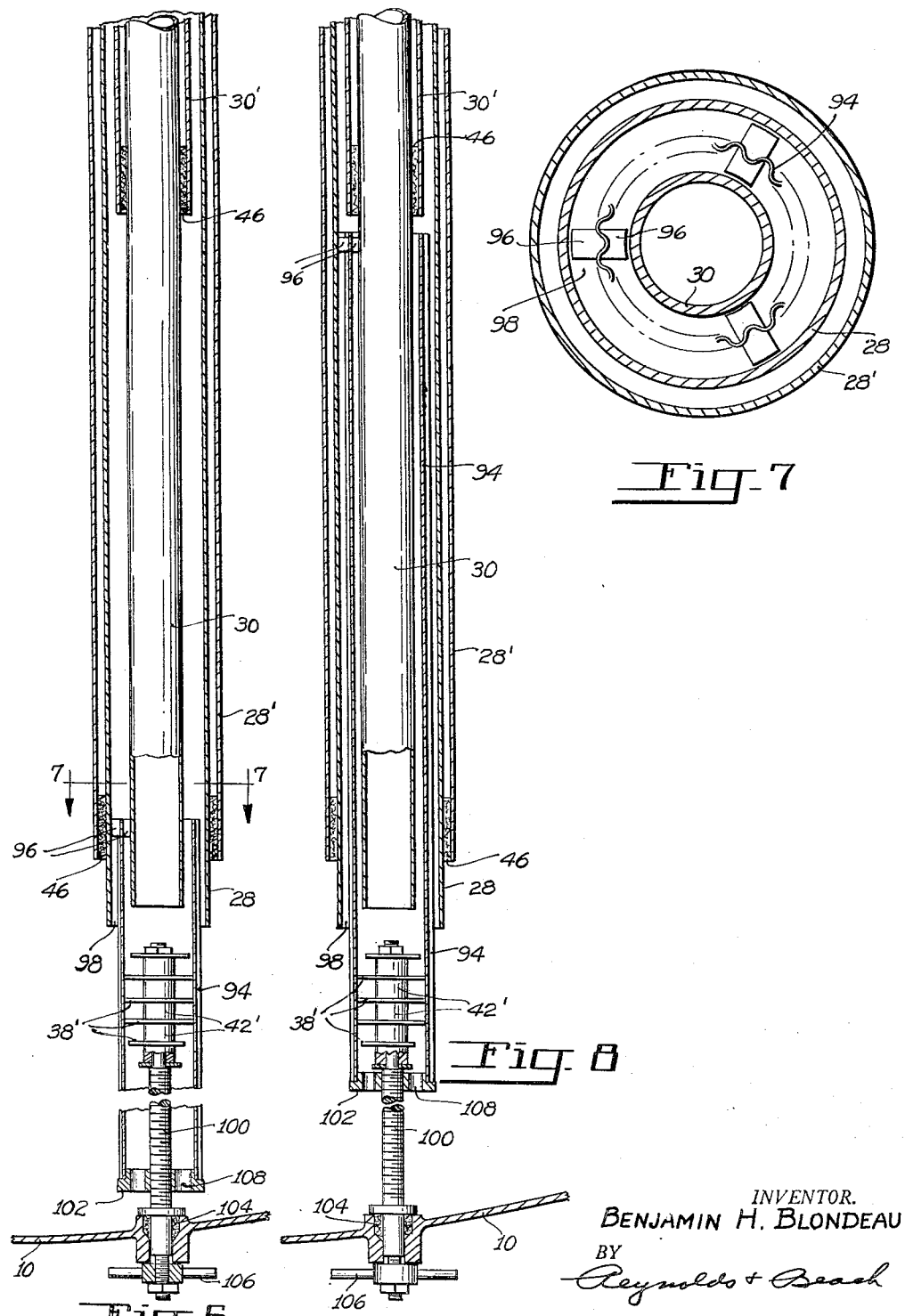

Patented Apr. 29, 1952

2,594,616

UNITED STATES PATENT OFFICE 2,594,616

HOT-WATER HEATING DEVICE AND METHOD

Benjamin Howard Blondeau, Seattle, Wash.

Application October 4, 1948, Serial No. 52,711

19 Claims. (Cl. 126—362)

This invention relates to circulating water heating apparatus and method, and particularly to novel circulating hot water storage tank means. The general type of system to which the invention is applied is that which utilizes hot water storage means, external heating means and an external circulatory circuit interconnecting such heating means and the tank. The primary object is to overcome a particular difficulty heretofore experienced in this type of system, with hot water stored in the tank being cooled unduly rapidly when the external heating means was rendered inoperative to heat the water. It was extremely difficult, therefore, to store the hot water in the tank over extended periods.

In such earlier systems, during normal periods of operation when the water is being heated, cool water is drawn from the bottom of the tank, is heated in the external circuit and thereupon rises as a result of its reduced specific gravity, to flow back to the top of the hot water storage tank, the process being continuous. Difficulty came, however, because of the reversed circulation occurring when the source of heat was removed from the external heating coil or the like. At that time water in the external circuit, instead of being heated, was cooled because of the heating coil and external circuit acting as a radiator of heat. Being cooled, the specific gravity of the water caused it to settle and return to the bottom of the storage tank, drawing hot water from the top thereof in a continuous process. As a result it was extremely difficult to maintain hot water in the storage tank for extended periods unless the furnace or other heating source was turned on, which on many occasions was undersirable.

In accordance with the present invention this undesired reversed circulation of the water due to external radiation of heat as described is eliminated in simple, effective manner, and the same is accomplished without in any way disturbing the normal direct circulatory flow by which the supply of hot water is created in the tank.

This advantageous result is accomplished through a method, and means implementing such method, by which flow of hot water into the tank from the external circuit is directed along prescribed paths and in a certain manner, namely, by causing hot water moving from the external circuit to the tank, to flow first along a downwardly directed confined path from a point substantially above the bottom of the tank to a point near the bottom of the tank, then reversely along a confined path to a point near the top of the tank for discharge into the body of water in it.

With this arrangement it has been found that hot water in the top of the tank is not readily withdrawn into the external circuit in reversed circulatory flow, apparently because of the impedence to such flow resulting from the necessity of drawing the hotter water downward through one leg of the confined path before it can rise or be drawn upward and out into the external circuit, the hot water tending to rise instead of settle. Preferably, the means defining the described path of flow comprises concentric tubes one within the other, the smaller tube being connected to the external circuit and opening at its lower end into the lower end of the larger pipe and the larger pipe communicating at its upper end directly with the top of the tank, although it is to be understood that such pipes need not be of different diameters and concentrically located but might be disposed side by side, or a single pipe bent back on itself, for example, as will be more fully apparent from the detailed description which follows.

A related feature of the invention is the provision of a communicating opening between the lower ends of such pipes and the lower portion of the tank, enabling drainage of such pipes when the tank is drained. In the illustrated case, such an opening is provided with a baffle to retard mixing of the hot water flowing downwardly in the first pipe with the cooler water in the lower end of the tank. Instead such water is diverted by the baffle, rising to the top of the tank through the second named or outer pipe, to be discharged into the body of hot water in the tank. Moreover, if there be any reversed circulatory flow in the external circuit when the latter is cool, such a baffle-covered opening as just mentioned causes the reverse flow therein to consist predominantly of cooler water drawn from the bottom of the tank, instead of hot water from the top, so that, the external water temperature being low, the amount of external heat radiation is slight and the water temperature in the tank is maintained high.

A related problem involved in such water heating and storage systems is frequently encountered where, in different installations, the furnace or other heat source is located a substantially greater or lesser distance from the hot water storage tank than it is in others. Heretofore, in one case, where the distance was exceedingly short, hot water from the heating coils might be cooled, by conduction or radiation of heat, only slightly in traveling to the hot water tank and might, therefore, be hotter than desired in the pipe between the upper end of the heater and the tank and in the upper end of the tank. In other cases in which the distance between the furnace and the tank was comparatively great, the water circulating to the latter would be cooled more than a normal amount by radiation through the connecting pipe.

In accordance with a related feature of my invention, the effect of these variations in distance of travel of the hot water to the tank may be compensated by adjustable means associated with or constituting a modification of the mentioned flow directing pipes in the hot water tank. Such means include an adjustable heat exchange element by which hot water from the external circuit is cooled in the tank by a controlled amount, determined primarily by tank-bottom temperature, before it passes to the top of the tank for discharge into the body of hot water therein. In the illustrated case this heating element comprises a third pipe concentric with the two concentric flow-directing pipes first-mentioned above, as will be hereinafter described.

These and other features, objects and advantages of the invention, including details of the construction of its preferred form and illustrative uses thereof will now be described more fully by reference to the accompanying drawings.

Figure 2:
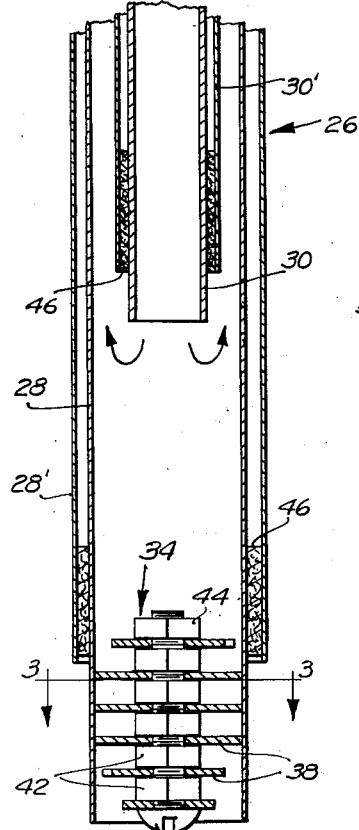

Figure 1 is a vertical section of a circulating hot water tank with external heating means associated therewith, embodying broad features of the invention; Figure 2 is a longitudinal section through the axis of novel flow directing means attaining objects of the invention; and Figure 3 is a transverse section taken on the line 3—3 of Figure 2, showing a preferred form of baffle in such flow directing means.

Figure 5:
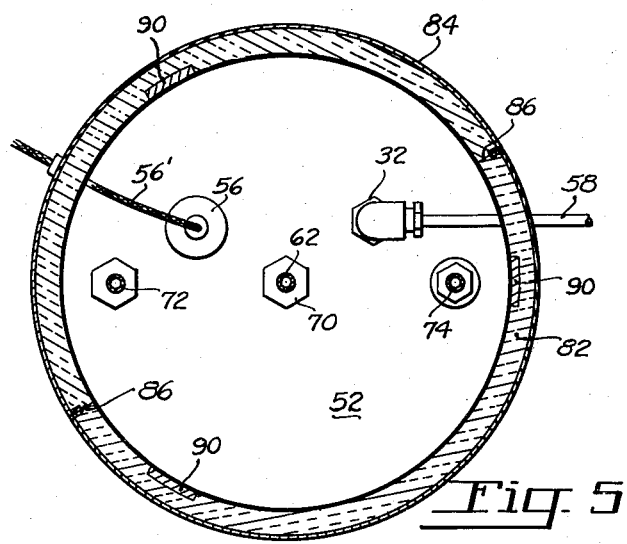
Figures 3, 4:
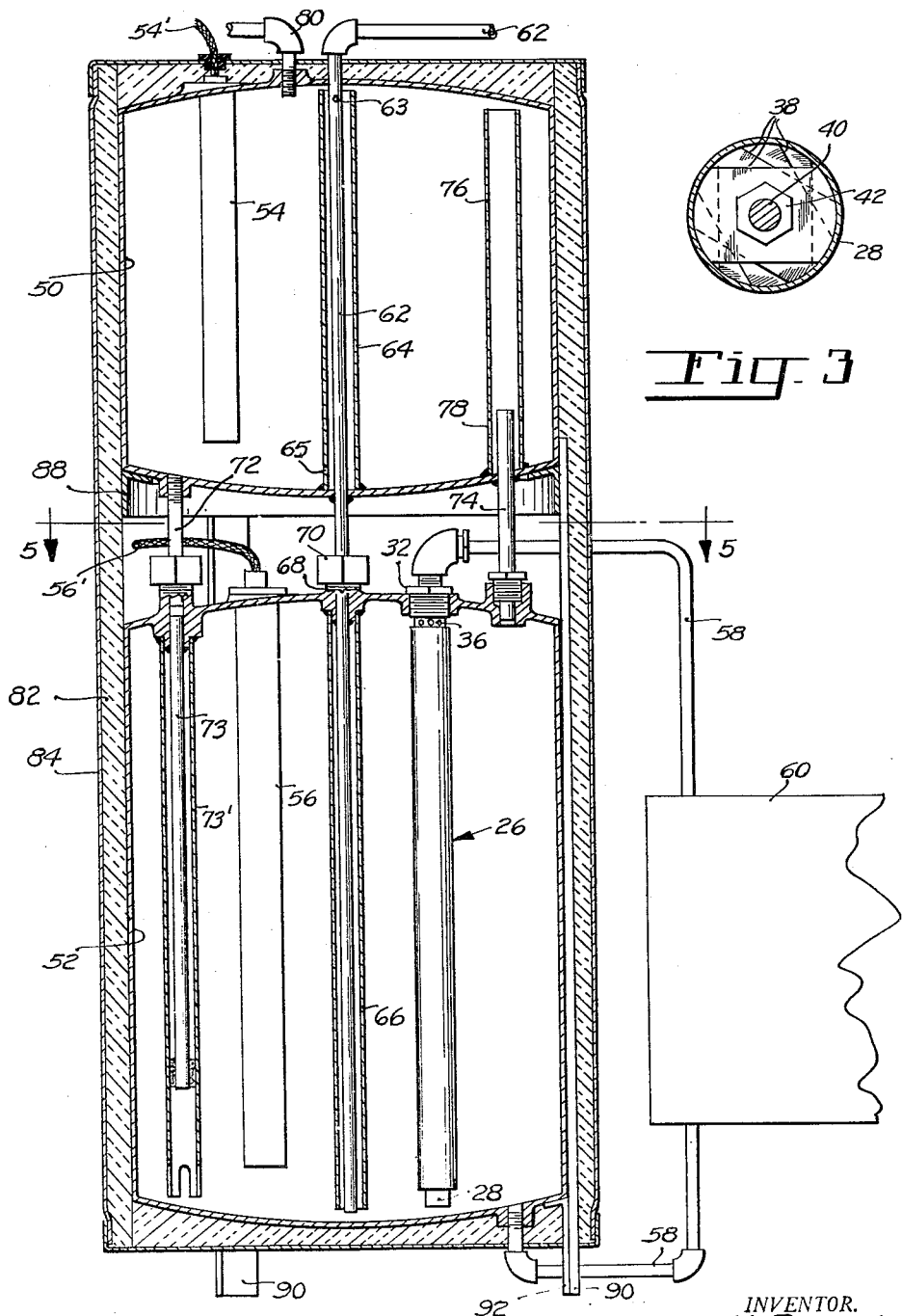

Figure 4 is a vertical section of a more elaborate circulating water heating system than that shown in Figure 1, embodying the invention, employing a pair of insulated hot water storage tanks arranged one above the other for short-period and standby uses respectively; and Figure 5 is a horizontal section of the same taken on section line 5—5 of Figure 4.

Figure 6 is a longitudinal section through the lower end portion of a modified form of my novel adjustable flow directing means, as mounted in a hot water storage tank, a fragment of the bottom of which is shown in the figure; Figure 7 is a cross-section of said modified flow directing means on line 7—7 of Figure 6; and Figure 8 is a view corresponding to Figure 6 showing such flow directing means in a different adjusted position.

In the circulating hot water heating and storage system of Figure 1, the cylindrical tank 10 with convex top and bottom closure plates is supplied conventionally with cold water by a pipe 12 entering the top of the tank and extending downward through its interior to a location near the bottom for discharge into the tank at that location. Hot water is withdrawn from the tank through an outlet pipe 14 at the tank's top. Operating in conjunction with the hot water tank 10, a furnace 16, located preferably as low as possible with relation to the tank, heats and thereby circulates water in the external circuit 18 to supply the tank 10 at its top with heated water and to withdraw cold water from its bottom generally in the well known manner. Usually the heating of water by the furnace 16 or other heating means is only its secondary function. It is also conventional to provide a separate, auxiliary heating means operating in standby or auxiliary relationship to the furnace 16, and the sole purpose of which is to provide hot water during periods when the furnace is not operating or is operating only at partial capacity. In this case, the auxiliary heating means is illustratively shown in the form of a side-arm heater 20, which may be of the gas burning or electric type, heating and circulating water to the tank through the external circuit 22.

As previously explained, in former systems employing only one external heating means such as the furnace 16, for example, during periods when such heating means was allowed to cool, the heating coil therein would radiate heat from the water in the pipes of the external circuit 18 to the surrounding atmosphere and thereby undesirably accelerating cooling of the water in the tank 10 by withdrawing hot water from the top of the tank for circulation in reversed direction through the external circuit, as discussed above, during which heat is radiated from the flow pipes and lost to the system. The same undesired result appeared, perhaps in exaggeration, when two alternatively operated external heating means were employed in conjunction with a hot water tank. In the latter case, during periods when one of the heating means was heating hot water for circulation to the storage tank and the other heating means was inoperative to heat the tank water, the latter would act as a radiator of heat to cool the water in its temperature exchange coil and thereby set up circulation in the reverse direction in its external circuit which would tend to lower the tank temperature. Thus while one external heating means was heating water in the tank the other heating means, then inoperative, would be cooling the water by heat radiation and lowering the efficiency of the entire system. Moreover, when both heating means were turned off their combined radiation cooling effect was felt in producing the reverse circulatory action and cooling of the tank water, whose temperature it was desired to maintain elevated over long periods.

According to the present invention it is unnecessary in most cases to alter in any respect the external circuits or their connections to circulating hot water storage tanks, so that the invention may be applied to existing installations without appreciable added cost or alteration. In its form shown in Figure 1, the common cold water outlet 24 from the tank to the two external circuits 18 and 22 is shown at the very bottom of the storage tank 10. The hot water return connections of circuits 18 and 22 to the top of the tank, 18' and 22', respectively, are preferably separated, in order to maintain separate circulating flow paths through the tank, of water from the external circuits, which is illustrative of the conventional practice. The change in such a system proposed by the present invention comprises the addition of flow directing means 26 within the tank, connected in series with one or, preferably, each of the respective hot water return connections 18' and 22'. Such flow-directing means does not offer additional impedance to the normal circulatory flow of hot water through the system and tank sufficient to interfere in any way with the delivery of hot water to the storage tank in the usual manner, although the undesired reversed circulatory flow of hot water previously described is virtually eliminated.

In its preferred and illustrated form the flow directing means (Figure 2) comprises a flow pipe or tube 30 connected to hot water return pipe 18' or 22', projecting downward from the top of the tank through its interior, and a concentric outer flow tube 28 somewhat larger in diameter than the tube 30 and projects below the lower end of the inner flow tube. The connecting pipe 22' or 18' is threaded into the central bore in a reducing bushing 32 which in turn is threaded into the upper wall of the tank to close off the tank. The upper end of the tube 30 forms a press fit sweated within the pipe 18' or 22', as shown. The bottom of the bushing 32 is counterbored and into the counterbore the tube 28 is inserted and welded to support the latter in its depending position concentric with the tube 30.

The function of the smaller, inner flow tube 30 is to direct hot water flowing from the internal circuit, downward in the tank interior to a point preferably near the tank bottom. Heated water from the external circuit is forced downward through this tube in the direction of the upper arrow in Figure 2 by the normal circulatory action of the system and enters the cavity in the lower end of the larger outer tube 28. The force of its flow downward would tend to carry the water out through the lower end of the tube 28 to mix with the cold water near the bottom of the storage tank 10, which would be undesirable since it would cool the hot water and retard the process of obtaining hot water first in the top of the storage tank in the usual manner. For most efficient operation, the hot water from the external circuit should emerge only at the top of the storage tank 10 to mix directly with other hot water therein, progressively accumulating downward and forcing the colder water out the bottom to the heater until the entire tank is filled with hot water. Accordingly, I provide a baffle arrangement 34 in the lower end of tube 28, which prevents direct passage of hot water flowing downwardly out of tube 30, into the tank generally, but instead diverts such flow upward into the passageway between the two tubes 28 and 30, as indicated by the arrows near the lower portion of the figure. The diverted hot water then rises freely to the top of the tube and passes out into the top of the tank 10 through one or more large openings 36 in the tube wall immediately adjacent to the top of the tank.

It is noted that hot water entering the top of tube 30 must drop a substantial distance, the length of the tube, before it can rise in tube 28. There is no difficulty in this, however, since this descending hot water need not displace lower temperature water, the temperature gradient along the reversed path through the tubes being only slight. Also the circulating force of the external circuit during heating of water is comparatively great, overcoming any resistance to downward flow of hot water in tube 30.

The baffle 34, previously described as diverting water flowing downward in tube 30, consists of a plurality of vertically spaced disks 38 threaded on a bolt 40 with spacer nuts 42 interposed between successive disks, and a retaining nut 44 threaded on the end of the bolt against the end disk. One or more of the disks are press fitted to the inside of the tube 28 to support the baffle in the lower end of the tube. The disks are not completely circular, however, having opposite segmental portions removed by cutting the disks along minor chords, so that they are flattened at opposite sides, to provide openings for flow of water through the tube 28 past such baffles. The flattened disks occupy rotated positions relative to each other (Figure 3) on their supporting bolt 40, so that the segmental openings formed between the flattened edges of the disks and the inner wall of the tube 28 are not in alignment, but the opening of one disk is overlapped by the axially projected area of another disk, to obtain the baffle effect while affording communication between the lower end of pipe and the tank bottom. With such a baffle, cold water from the bottom of the tank may, if drawn upward as by attempted reverse circulation in the external circuit as previously mentioned, flow into the tube 28, although not rapidly, while, during normal or direct circulation, very little, if any, of the downwardly moving hot water from the tube 30 passes through the baffle in preference to being diverted or doubled back for reversed upward flow between the tubes 28 and 30, as described. Obviously, other types of baffle arrangements would serve the same purpose as the preferred baffle just described.

Preferably the tubes 28 and 30 have insulating jackets which minimize transfer of heat from hot water to cold outside or within them, depending upon the direction of circulation of water at different times, as will appear subsequently. A convenient way of providing insulating jackets on the tubes is to surround them with dead air space, as that formed within larger tubes, concentric with them and sealed off at the ends. Thus tube 28 has a jacketing tube 28' which extends substantially from the lower edges of the apertures 36 to near the bottom of the tube 28, and thereby provides a jacketing dead air space around substantially the full length of the tube through which the hot water flows upwardly. Tube 30 is preferably similarly jacketed by a larger tube 30' within the tube 28. The upper ends of these jacketing tubes are conveniently sealed to the outer walls of their insulated tubes by welding or brazing in a permanent connection. While the lower ends of the jacketing may be similarly rigidly connected to the insulated tubes, it is desirable to allow for differential temperature expansion of the several tubes because of temperature differences on opposite sides, and for this reason the connection at one end, which is the bottom in the example shown, is sealed by packing 46, which allows differential changes in length of a jacketing tube and its insulated tube without affecting the water-tight seal maintaining the dead air space between tubes.

With the details of construction of the flow-directing means 26 now in mind, its operation in improving the efficiency or circulatory water heating systems may now be evident. The flow of hot water into the tank through the tubes 30 and 28 consecutively along the downwardly and upwardly directed reversed paths has already been explained in describing the way hot water properly emerges into the tank water at the top of the tank. When the heating cycle is reversed, that is, when the source of heat is removed in the external circuit and heat from the water is radiated by the coil in the external heating means, the cooling of water at that location causes it to settle in the external circuit, feeding cold water into the bottom of the storage tank and tending to draw hot water through the connection at the top of the tank.

When conditions are such that reverse flow tends to take place, in order for hot water to be withdrawn from the top of the tank and through the outlet from pipe 30 into the external circuit, it would first have to be drawn downward through apertures 36 and substantially the full length of pipe 28 before it could be drawn or rise upward through the pipe 30. At the same time, water then contained in the tube 28 will be approximately at the same temperature as water immediately outside the tube at each vertical location, heightwise of the tube. However, the bottom of the tubes will contain colder water approximately at the temperature of the tank bottom, since cold water is then admitted through the lower end of tube 28 past the baffles 34, while the temperature of the water in the tubes will gradually increase toward the top of the tube 28, substantially at the same temperature gradient as the surrounding water in the tank. Consequently, because hot water at the top between tubes 28 and 30 must displace more dense cooler water at the bottom in order to descend, there is an effective head against which the hot water through apertures 36 must be drawn before it will reach the downwardly opening end of the tube 30.

The force of reverse circulatory flow caused by cooling of water in the external circuit is usually not great enough to effect this displacement of the hot water from the top of the tank to the bottom. Instead, any slight circulatory action which may occur in the external pipe merely draws cool water past the baffles 34 and up into the tube 30. Thus not only is the temperature of water drawn from the tank into the external circuit greatly reduced, but the volume of flow is likewise reduced from what it would be were the flow directing means 26 of the invention not incorporated. Heat radiation in the external circuit at such times is thereby greatly lessened. Because pipe 30 is jacketed over the greater part of its length, as is pipe 28, any heat exchange from the hot water near the top of the tank surrounding these pipes to the cold water moving slowly upward through pipe 30 is only slight.

I also provide a small breather opening 48 in the wall of pipe 30 near the top of the tank which will enable some slight amount of hot water to be withdrawn from the tank during the time the side arm heater, for example, is inoperative to heat the water, as when the furnace is burning at full capacity, to prevent freezing of water in the side arm heater coils at that time. The same action occurs when the furnace is not in operation, to afford some circulation through the furnace coils. A second function of breather opening 48 is to enable draining the external circuit independently of the tank, it being merely necessary to vent the top of the tank through a suitable normally closed opening, when such drainage is desired.

In its method aspect the invention contemplates the steps of directing the hot water along a confined path downward toward the bottom of the tank, and then upward toward the top along another confined path for emerging into the hot water in the tank at the top, and introducing cold water from the tank bottom into the reverse path of flow at the point of path reversal in order to produce the described temperature gradient corresponding to that within the tank, which prevents the undesired reverse circulatory action previously experienced. Likewise in its broader apparatus aspects the invention is not necessarily restricted to the concentric tube arrangement herein specifically illustrated, but may assume other forms as well.

In another application of the invention the flow directing means 26 is advantageously applied to a hot water heating and storing system of the multiplex circulating hot water tank type, in which two or more tanks, one above the other, are connected in cooperative relationship. Such a system is illustrated in Figure 4, wherein the upper tank 50 is smaller than the lower tank 52, and is usually the only one employed to store hot water when needs are not great. Such an arrangement is more efficient, since less heat is required to maintain a steady supply of hot water at a predetermined elevated temperature in a small tank than in a large tank, although the larger tank 52 is necessary as an auxiliary or stand-by unit, when the capacity of the upper tank 50 is not sufficient to meet demands.

Each of the tanks 50 and 52 is shown incorporating electric heating elements 54 and 56, respectively, of the submerged type which enter the tanks through their side walls or, as shown, through their upper ends whichever is preferred, and are supplied with heating current by the insulated wires 54' and 56', respectively. As illustrated, the upper tank has no direct external heating circuit through a furnace or the like, whereas the lower tank does have the external circuit 58 which may pass through the hot water coil in a furnace 60 in the conventional manner. As will appear subsequently, this single external heating means, when placed in operation, serves to heat the water for storage in both the upper and lower tanks. The flow-directing means 26 is connected as before to the hot water inlet of the tank from the external circuit 58. When the furnace 60 is operating, hot water from the external circuit 58 enters the lower tank 52 at its top through apertures 36 in the unit 26, while the unit prevents reverse circulatory action of the water through the furnace when the latter is allowed to cool off, as previously explained.

The cold water supply pipe 62 delivers cold water into the bottom of the lower tank 52 to fill both tanks, there being one or more communicating passages between the tanks to cause both to be filled from the single supply. Preferably the cold water supply pipe 62 enters the composite tank unit through the top of the upper tank 50, and extends downward through both tanks, to deliver water at the bottom of the lower tank. A jacketing tube 64 surrounds the pipe 62 over substantially its full length in tank 50, and a similar jacketing pipe 66 surrounds the depending length of pipe 62 in tank 52, thereby minimizing transfer of heat from the hotter water in the tanks to the entering cold water in supply pipe 62. Pipe 62 has a small breather hole 63 near its upper end in upper tank 50, while pipe 64 has a drainage hole 65 near its lower end in tank 50, enabling drainage of such pipe when the tank is drained, and also has a vent opening at its upper end. The pipe 62 is broken at its point of entrance through the top of tank 52 to enable removal of either tank section without disturbing the other tank section. The upper and lower portions communicate, however, since the upper portion of cold water supply pipe 62 is slipped into the bore of an upstanding flange 68 on the top side of the upper end wall of tank 52. The slip joint is sealed by suitable packing pressed into the joint by tightening the slip nut 70 threaded on the outside of the flange 68.

Another pipe 72 projecting downward from the bottom of the tank 50, is similarly slip-connected to the top of the tank 52 for ready removal therefrom. The function of pipe 72 communicating between the upper and lower tanks, respectively, is to allow cold water to be drawn into the lower tank 52 from tank 50 to replace hot water rising from the lower tank to the upper tank through a third interconnecting pipe 74. For this purpose, pipe 72 is continued downward into tank 52 to a location near its bottom by a separate extension pipe 73, which is jacketed by a somewhat longer pipe 73' extending to a point near the very bottom of lower tank 52 and beyond the lower end of pipe 73. The pipe 73' serves to insulate pipe 73 against loss of heat to the descending cold water from the hot water in the upper end of lower tank 52.

Whenever the water in the lower tank 52 is heated to a temperature sufficiently high with relation to the temperature of water in tank 50, the hot water at the top of the lower tank will rise into the upper tank through the communicating pipe 74, and will displace cold water from the bottom of upper tank 50 through the series-connected pipes 72 and 73 to the bottom of the lower tank 52, forming a continuous circuit. In order to have this rising hot water entering the tank 50 emerge into the hot water at the top of the upper tank 50, rather than mixing with the cooler water at the tank's bottom, I provide an extension tube 76 rising upward from the bottom of the upper tank 50, to a point near its top, this tube being of somewhat greater diameter and surrounding the short upwardly projecting length of pipe 74 in tank 50.

Frequently, however, the water in the lower tank 52 will not be heated. To prevent circulation through the lower tank from the upper tank the tube 76 is provided with one or more openings 78 near its lower end. When tapping off hot water from the top of tank 50 through the hot water outlet 80, these openings will allow passage of cold water drawn upward through pipe 74 from the lower tank, directly into the surrounding cold water in the bottom of the upper tank 50, instead of drawing it the entire length of pipe 76 to the top of such tank for admixture with the hot water there. However, if the water in the lower tank 52 is hot, when hot water is drawn from the upper tank 50 the hot water rising through pipe 74 does not pass out through openings 78 since the upper end of the pipe 74 extends slightly above the upper edge of such openings and such hot water rises the entire height of pipe 76 to merge with the hot water at the top of the upper tank 50 as desired. The same action of the hot water occurs under normal circulatory heating of water in lower tank 52 when no water is being tapped from the outlet of upper tank 50.

For domestic purposes it may be that the electric heating element 54 in the upper tank 50 is of sufficient capacity with a tank of selected size that normal hot water needs are met without applying heat to the water in the lower tank. However, when the household demands for hot water are greater, water in the lower tank may also be heated, either by the submerged heating element 56 or by an external heater circuit 58, to add to the total volume of hot water available. In the summer the submerged heating element 56 will probably be the more convenient heating element for the lower tank, if a large amount of hot water is required, since the furnace 60 will then normally not be in operation. At that time the flow-directing means 26 prevents reverse circulatory flow of hot water through the external circuit 58 and consequent lowering of the efficiency of the system by radiating heat from the furnace coils. In the winter, with the furnace 60 operating most of the time, this alone may be a sufficient source of heat for both tanks, and the submerged heating elements 54 and 56 need not be used.

Structurally the tanks are preferably mounted in the illustrated manner, with a common insulating jacket 82 of cylindrical form conforming to the peripheral shape of the tanks, and of adequate height to extend beyond the outermost ends of both tanks, and a protective sheet metal shield 84 surrounding the insulation. As shown in Figure 5, the insulating jacket 82 and the shield 84 are split along a diameter, to enable separating the halves at the parting lines 86 and to provide access to the tanks and their immediate connections. The pipe connections directly between the tanks are preferably of the slip nut type, so that either tank may be removed from the assembly and replaced without disturbing the other tank or other components of the system.

The upper tank rests directly upon a circular flanged base 88, shown supported by three triangularly spaced vertical legs 90, to which the lower tank is suitably secured, and which project below the bottom end of the encasing shield 84 to rest on a floor (Figure 4). One of these legs, namely, that shown at the right in Figure 4, is readily removable to gain access to the pipe connections between the tanks. When the leg 90 is removed for this purpose, the weight of the upper tank previously carried by the leg will then be transferred to the pipes 74 and 62 pressing downwardly against their connections at the top of the lower tank 52. At the same time the leg is removed, the total weight which it carried is now borne by a short leg 92, specially provided for that purpose at the bottom of the lower tank 52. Consequently the composite tank structure is readily assembled and disassembled initially, and may be easily taken apart and put together for repair purposes.

A modified form of flow directing means applicable to either of the previously described and other tank structures or arrangements is illustrated in Figures 6, 7 and 8. The essential difference of this modified form of flow directing means resides in the additional provision of an adjustable heat exchange element operable to regulate the temperature of hot water discharged at the top of the outer tube 28, by reference to the lower temperature of water at a lower level in the tank. The effect of such an arrangement is to provide compensation for overly heated water flowing into the tank from the external circuit, so that such water will be cooled somewhat before discharge into the top of the tank, and at the same time the pipe system will be cooled, as will be explained.

As illustrated, this heat transfer element may take the form of a fluted tube 94 surrounding the lower end of the central or inner tube 30 and received within the annular space between the inner and outer tubes 30 and 28, respectively, to project from the bottom thereof toward the tank's bottom. Preferably the fluted tube is provided with inside and outside spacer buttons 96 at its upper end, which maintain such tube substantially concentric with the tubes 28 and 30, as shown.

The purpose of fluting the tube 94, although such fluting is optional and only one way of accomplishing the result, is to enhance its heat exchange properties. Hot water descending through the inner tube 30 enters the space within the fluted tube 94 before it reverses its flow to rise in the annular space between the tubes 28 and 30 for ultimate discharge into the tank at its top. During the short period this hot water is reversing its direction of flow and as within the fluted tube it is cooled an amount determined primarily by the temperature of and extent of contact with the walls of such tube. In this connection, there is an annular space 98 between the outer wall of the fluted tube and the inner wall of the tube 28, of a length determined by the amount of vertical overlap of such tubes. The water in this space is at a temperature near that of the water in the tank bottom since such water is not in the direct flow path of the hot water passing from the inner tube 30 through the outer tube 28. The water in the space 98 thereby tends to cool the fluted tube against the heating effect of hot water within it, and hence cools such hot water, as mentioned. At the same time, however, it in turn receives heat from the hot water within the fluted tube 94, and as an end result water in the space 98, being thus heated, rises through the space 98 to merge with the stream of hot water flowing upward in the tube 28.

It will therefore be evident that a small but regulated amount of water from the tank bottom is continuously being heated in the space 98, for admixture with hot water passing successively through the tubes 30 and 28. If the hot water descending in tube 30 is overly heated the amount of cool water from the tank bottom drawn through the annular space 98 surrounding the fluted tube 94 will be increased, whereas it will naturally decrease as the temperature of the hot water falls. The cooling of water rising between pipes 28 and 30 cools off the inner pipe 30 and thereby cools the lead-in pipe connected thereto, which maintains a lower temperature in the external circuit, thus balancing the temperature conditions.

The walls of the fluted tube 98 are preferably very thin so that heat transfer occurs primarily directly through such walls and not appreciably by conduction of heat lengthwise thereof. Accordingly, the cooling effect of water in the tank bottom and surrounding the projecting body of the fluted tube does not greatly influence temperature of water in the space 98 or within the fluted tube by conduction through such tube.

The amount of overlap of the fluted tube 94 with the lower end of the tube 28 may be adjusted to vary the length of the annular space 98 and therefore the relative amount of water therein being heated at any time. This in turn correspondingly varies the amount of water rising through such space for admixture with the hot water. If the overlap is great the proportion of the cooler water drawn from the tank bottom will be greater and the cooling of the hot water accordingly more extensive, and vice versa. To accommodate vertical movement of the tube 94 within tube 28 the insulating jacketing tube 30' is shortened at its lower end, as shown.

A convenient mechanism for affecting adjustment of the fluted tube in this manner consists in the use of a rod 100 rotatably supported in the bottom of the tank 10 and projecting upwardly therein into threaded engagement with a nut 102 fixed in the lower end of the fluted tube, so that rotation of the rod 100 will affect vertical movement of the fluted tube. The lower end of the rod passes through a packing gland 104 in the tank bottom where it is properly held against vertical shifting, and is provided with a handle 106 outside the tank to effect rotation of such rod, as illustrated. The upper end of the rod carries the baffle disks 38' corresponding to the disks 38 in the figures previously described. These disks are likewise apertured and, mounted on the reduced end portion of the rod 100, are separated by suitable spacers 42' encircling the rod. To afford communication between the tube 30 and the upper end of the fluted tube 94 the nut 102 may be provided with one or more apertures 108.

While the external adjusting mechanism for the fluted tube 94 may be dispensed with in particular instances, I prefer to incorporate the same, or equivalent externally located adjusting means, in manufactured hot water tanks embodying the invention. The reason for this preference is that the adjustment need not be made at the factory or in the process of installing the hot water tank in a given installation, which is inconvenient and may be difficult and awkward where the precise requirements of an installation are not known until after testing, but the adjustment may be left until the system is completely installed and tested. At that time the handle 106 may be turned until it is found that the hot water in the pipes and tank is as hot as desired, with the furnace or other heating source operating at full capacity. Readjustment may be made at any time if it is found that the water is cooled too much or too little.

It is to be noted that an excessive overlap of the fluted tube with the tube 28 does not result in the loss of any substantial amount of heat in the tank water but merely reduces the temperature of the water at the top of the tank.

A point which should not be left unnoted is the applicability of the invention generally to a system in which the external circuit incorporates, in addition to the normal heating means for the tank water, radiator means for heating a room or the like. In such a case, during heating of the water in the heating means the room will likewise be heated by the radiator through which the hot water then flows in its direct circulation in the external circuit and to the tank. However, when the source of heat is removed and heat is no longer required in the room, hot water will nevertheless be stored in the tank over an extended period despite the presence of the radiator, since reverse circulation of hot water from the tank is prevented by use of my novel flow directing means described.

It is further desired to point out that the invention may well be applied to heating and storage systems for liquids other than water, since the principles involved are the same in the case of all liquids, the specific gravity of which decreases upon temperature rise.

I claim as my invention:

1. In water heating and storage systems, the method comprising directing flow of hot water from an external circuit downward along a confined path within said storage means and to a location substantially below the top thereof, deflecting the downwardly flowing water at such point for reversed flow upward to a location near the top of said storage means, discharging such hot water at such latter location into the general hot water supply at the top of such storage means, and admitting the cooler water from said storage means into said confined path at a location in the vicinity of the point of path reversal, to impede reverse flow of hot water in said path, when there is a tendency for reverse circulatory flow through the external circuit.

2. In a water heating and storage system including a hot water storage tank and an external heating circuit operatively connected thereto, flow directing means interposed in series with the hot water delivery end of said circuit, at the tank, said means comprising a first conduit means to direct flow of water downward from said circuit delivery end to a location substantially below the top of said tank and further conduit means to direct flow of water from the lower end of said first conduit means upward in the tank to a location in the vicinity of its top for discharge into the tank generally.

3. The water heating and storage system defined in claim 2, wherein the first conduit means comprises a tube and the further conduit means comprises a second tube of larger diameter and surrounding the first tube and apertured near its upper end for discharge of water therefrom.

4. The water heating and storage system defined in claim 3, and baffle means operatively disposed in the lower end of the outer tube, the inner tube terminating short of such lower end of the outer tube and above the baffle.

5. The water heating and storage system defined in claim 3, wherein the tubes are individually jacketed by insulating means to minimize heat exchange between water within and outside them, respectively.

6. The water heating and storage system defined in claim 3 wherein the tubes are individually jacketed by tubes of larger diameter to form air jackets surrounding such tubes, thereby to minimize heat exchange between water within and outside them, respectively, said jacketing tubes being rigidly secured and sealed at one end to their respective jacketed tubes and slidably connected and sealed at their opposite ends thereto.

7. In a water heating and storage system including a hot water storage tank and an external heating circuit operatively connected thereto, flow directing means projecting from the top of said tank downwardly therein, interposed in series with the hot water delivery end of said circuit at the top of the tank, said means comprising a first conduit means to direct flow of water downward through the interior of the tank from said circuit delivery end to a location substantially below the top of said tank and further conduit means to direct flow of water from the lower end of said first conduit means upward in the interior of the tank to a location in the vicinity of its top for discharge into the tank generally.

8. In a water heating and storage system including a hot water storage tank and an external heating circuit operatively connected thereto, flow directing means interposed in series with the hot water delivery end of said circuit, at the tank, said means comprising a first conduit means to direct flow of water downward from said circuit delivery end to a location substantially below the top of said tank, further conduit means to direct flow of water from the lower end of said first conduit means upward in the tank to a location in the vicinity of its top for discharge into the tank generally, a small breather hole in the wall of said first conduit means near its top and baffle means at the lower end of said further conduit means, disposed operatively to deflect downwardly flowing water from said first conduit means upward through said further conduit means, yet to admit cooler water from the tank generally therethrough into the lower ends of said conduits to impede reverse flow of hot water in said conduit means, when there is a tendency for reverse circulatory flow through the external circuit.

9. A flow directing unit comprising an outer tube, an inner tube within said outer tube and extending lengthwise thereof, one end of said outer tube extending beyond the corresponding end of said inner tube, baffle means mounted at such end of the outer tube operable to deflect water flowing from the inner tube back through the outer tube and to admit water from outside the baffle, and means enclosing the opposite end of said outer tube, said outer tube having an opening in the wall thereof in the vicinity of said closure means.

10. The unit defined in claim 9, and jacketing means for said tubes comprising jacketing tubes defining enclosed spaces surrounding the respective jacketed tubes substantially over their full length.

11. The water heating system comprising hot water storage tank means, an external heating circuit connected at its ends to the upper and lower portions of said tank, and flow directing means within said tank means, comprising a first conduit to direct hot water from said external circuit downward through the interior of said tank, a second conduit upwardly directed in said tank and communicating at its lower end with the lower end of said first conduit, means to deflect downwardly flowing water from said first conduit upward through said second conduit, but having an opening to admit the cooler water from the tank generally into within the lower ends of said conduits when there is a tendency for reverse flow of hot water through said external circuit, means at the upper end of said second conduit to discharge hot water flowing upwardly therein into the top of said tank generally, and a breather hole formed in said first conduit near its upper end within the tank to enable draining the external circuit independently of the tank.

12. The hot water heating system comprising a first hot water storage tank, an external heating circuit connected at its ends to the upper and lower portions of said tank, and flow directing means within said tank, comprising a first conduit to direct hot water from said external circuit downward through the interior of said tank, a second conduit upwardly directed in said tank and communicating at its lower end with the lower end of said first conduit, means to deflect downwardly flowing water from said first conduit upward through said second conduit, but having an opening to admit the cooler water from the tank generally into within the lower ends of said conduits when there is a tendency for reverse flow of hot water through said external circuits, means at the upper end of said second conduit to discharge hot water flowing upwardly therein into the top of said tank generally, a second hot water storage tank associated cooperatively with said first tank and operatively supported above the elevation of said first tank, conduit means communicating between the bottoms of said tanks, communicating conduit means communicating between the top of the lower tank and the bottom of the upper tank, said conduit means projecting a short distance above the bottom of the lower tank and into the interior thereof, a surrounding conduit projecting upwardly above said latter conduit to a location near the top of said upper tank to direct flow of hot water from the conduit thereby surrounded from the top of said lower tank to the top of said upper tank, said surrounding conduit having an aperture in the wall thereof disposed below the upper open end of the second-mentioned communicating conduit, cold water supply means for delivering cold water to the bottom of the lower tank and hot water outlet means connected to the upper end of the upper tank.

13. A flow directing unit for water heating and storage systems, comprising an outer tube, an inner tube of smaller cross-section, means supporting said inner tube disposed within and substantially coaxial with said outer tube, a thin-walled heat exchange tube of intermediate cross-section relative to said inner and outer tubes, and means supporting said heat-exchange tube interposed between said inner and outer tube to overlap mutually with end portions thereof, the relative dimensions of said tubes being such as to provide flow spaces between said heat exchange tube and said inner tube and said outer tube.

14. The flow directing unit defined in claim 13, and means cooperating with the supporting means for the heat exchange tube and operable to adjust the extent of overlap of said heat exchange tube with the inner and outer tubes by axial shifting of said heat exchange tube.

15. The flow directing unit defined in claim 13, wherein the heat exchange tube is fluted, and spacer elements mounted inside and outside said heat exchange tube near its end overlapping the inner and outer tubes, to maintain the walls of such heat exchange tube separated from the inner and outer tubes.

16. Hot water storage tank means, comprising a storage tank, substantially coaxial vertically disposed inner and outer tubes fixedly mounted at their upper ends at the top of the storage tank and coextending downwardly theerefrom within said tank to a location near the bottom of said tank, a heat exchange tube mutually overlapping the lower end portions of said inner and outer tubes and of intermediate cross-section relative thereto, to provide annular flow spaces between said heat exchange tube and said inner and outer tubes, adjustable supporting means for said heat exchange tube having a control member extending through the bottom wall of said tank, and operable to move such tube axially relative to said inner and outer tubes to vary the extent of overlap therewith, said outer tube having an outlet opening near the top of said tank, said inner tube being adapted for connection to an external water heating circuit, and baffle means within said heat exchange tube at least partly obstructing direct flow from the lower end of said inner tube to the bottom portion of said tank.

17. In water heating and storage systems wherein hot water is delivered to and stored in a storage tank after heating of such water in an external circuit, the method comprising directing flow of hot water from the external circuit downward through the storage tank in a path confined and separated from the surrounding body of water contained in the tank, to a location substantially below the top of the storage tank, and directing flow of such hot water upward in such storage tank in a further path confined and separated from the body of water contained in the tank, to a location near the top of the storage tank, and, at such upper location, discharging the hot water into the body of water contained in the tank.

18. In water heating and storage systems wherein hot water is delivered to and stored in a storage tank after heating of such water in an external circuit, the method comprising directing flow of hot water from the external circuit downward through the storage tank in a path confined and separated from the surrounding body of water contained in the tank, to a location substantially below the top of the storage tank, at such location bringing such hot water into conductive, heat-exchange relationship with relatively cool water in the tank at such location and thereby somewhat cooling such hot water and somewhat heating the water in the tank at such location, and directing flow of such somewhat cooled hot water upward in the tank from such location in a further path confined and separated from the body of water contained in the tank, to a location near the top of the storage tank, and, at such upper location, discharging the hot water into the body of water contained in the tank.

19. In water heating and storage systems wherein hot water is delivered to and stored in a storage tank after heating of such water in an external circuit, the method comprising directing flow of hot water from the external circuit downward through the storage tank in a path confined and separated from the surrounding body of water contained in the tank, to a location substantially below the top of the storage tank, at such location mixing with such hot water some of the relatively cool water in the tank at such location and thereby somewhat cooling such hot water, and directing flow of such mixture of cool and hot water upward in the tank from such location in a further path confined and separated from the body of water contained in the tank, to a location near the top of the storage tank, and, at such upper location, discharging such water mixture into the body of water contained in the tank.

BENJAMIN HOWARD BLONDEAU.

REFERENCES CITED

The following references are of record in the file of this patent:

UNITED STATES PATENTS

| Number | Name | Date |
|---|---|---|
| 1,279,710 | Kirke | Sept. 24, 1918 |
| 1,425,427 | Watson | Aug. 8, 1922 |
| 1,668,639 | Fisher | May 8, 1928 |
| 2,123,809 | Seitz | July 12, 1938 |